Patented Oct. 20, 1942

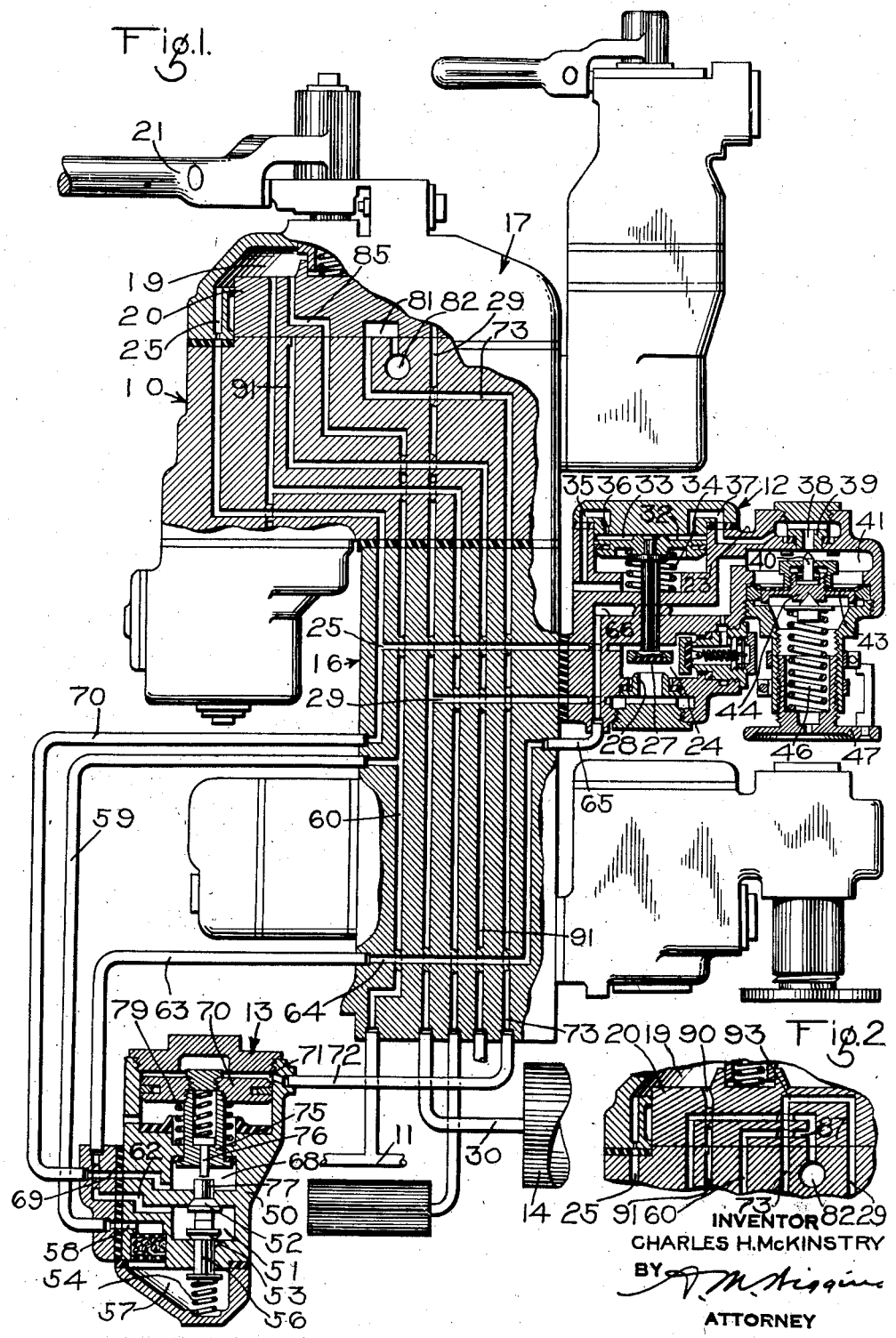

2,299,485

UNITED STATES PATENT OFFICE 2,299,485

FLUID PRESSURE BRAKE

Charles H. McKinstry, Wilmerding, Pa., assignor to The Westinghouse Air Brake Company, Wilmerding, Pa., a corporation of Pennsylvania Application February 28, 1941, Serial No. 381,009

11 Claims. (Cl. 303—59)

This invention relates to fluid pressure brakes for a locomotive, and particularly to a brake valve equipment including feed valve means of the remote-control type.

In an air brake system of the type embodying a normally charged brake pipe, a feed valve device is customarily provided for regulating the pressure of air supplied to the brake pipe while the usual brake valve device is in running position. One well known form of feed valve device is designed to effect an accelerated flow of air to the brake pipe during a brake release operation, and for that purpose is provided with a controlling element adapted to respond to the pressure of air at a point remote from the inlet and outlet of the feed valve, such point being preferably a brake pipe port within the brake valve device.

When a feed valve device having such a control feature is associated with a locomotive brake valve device of the well known No. 8ET type, in which the usual rotary valve chamber is designed to receive air directly from the feed valve, it is desirable to provide auxiliary controlling means for limiting the supply of air by the feed valve device in response to movement of the brake valve device to emergency position. It will be apparent that the feed valve device would otherwise respond to an emergency reduction in brake pipe pressure assuming its fully open position and thus feed air at substantially main reservoir pressure through the rotary valve chamber to the application cylinder of the associated distributing valve, thereby causing an excessive degree of application of the locomotive brakes.

A principal object of the present invention is to provide improved means operatively interlocked with a brake valve device for transferring the control point of a feed valve of the remote-control type from the usual brake pipe port to the discharge outlet of the feed valve, during operation of the equipment to produce an emergency application of the brakes.

Another object of this invention is to provide means of the above description which will operate directly in response to manipulation of the brake valve device.

In the accompanying drawing, Fig. 1 is a diagrammatic elevational view, partly in section, of a locomotive brake valve equipment including a feed valve device of the remote-control type and means constructed in accordance with the invention for controlling the feed valve device; and Fig. 2 is a fragmentary sectional view illustrating the rotary valve of the brake valve device in its emergency position.

Referring to the drawing, the locomotive brake equipment may include a brake valve device 10 which is operative to control the pressure of air in a brake pipe 11, a feed valve device 12, a control valve device 13, and a main reservoir 14. It will be understood that these elements of the brake system are shown in diagrammatic form, and constitute only such portions of the complete system as are required to illustrate the invention, the other elements usually associated with a locomotive brake valve having been omitted in order to simplify the drawing.

The brake valve device 10 comprises a pedestal portion 16, and a head portion 17 having formed therein a rotary valve chamber 19, which contains a rotary valve 20 that is operative through the medium of a handle 21. Although the brake valve device 10 is illustrated in elementary diagrammatic form, it will be understood that the device may be provided with all of the usual features embodied in such apparatus as the aforementioned No. 8ET equipment. The rotary valve 20 is of course movable from the running position, shown in Fig. 1, to various other positions such as service, lap, and emergency positions.

The feed valve device 12 comprises a casing structure 23 which is bolted or otherwise secured to the pedestal portion 16 of the brake valve device, and has formed therein a valve chamber 24 that is in communication at all times with the rotary valve chamber 19 of the brake valve device by way of a passage 25. Operatively mounted in the valve chamber 24 is a supply valve 27, which is adapted for engagement with a seat rib 28 carried by the casing structure for controlling communication between the chamber and a passage 29, which leads in one direction to a port in the seat of the rotary valve 20 and in another direction to a pipe 30 communicating with the main reservoir 14. The valve 27 is provided with a stem which is slidably mounted in a suitable bore formed in the casing structure 23 and is secured to a piston 32 having formed at one side thereof a piston chamber 33. The piston 32 is subject to the force of a coil spring 34 which is adapted to move the piston upwardly for unseating the valve 27, in opposition to the pressure of air which may be admitted to the piston chamber 33. The piston chamber 33 at all times communicates with the atmosphere by way of a passage 35 having a restricted portion 36, and also communicates by way of a passage 37 with a bore 38 formed in a valve seat element 39 carried by the casing structure.

The valve seat element 39 has a valve seat arranged for engagement by a needle valve element 40, which is contained in a control chamber 41 and is adapted to control communication between that chamber and bore 38 in accordance with movement of a flexible diaphragm 43, which carries a follower assembly 44 adapted to support the needle valve element 40. The diaphragm 43 is subject on one side to the pressure of air in the control chamber 41, and is biased in opposition to the fluid pressure by the force exerted by a coil spring 46, which is interposed between an adjustable tensioning element 47 and a suitable spring seat element engaging the follower assembly 44. As will hereinafter be explained, the source of air under pressure admitted to the control chamber 41 is determined by operation of the control valve device 13, which is in turn responsive to operation of the brake valve device 10.

According to the invention, the control valve device 13 comprises a casing structure 50 having a valve chamber 51 which contains a pair of connected valve elements 52 and 53, which are normally urged into seated and unseated positions, respectively, under the force exerted by a coil spring 54. The spring 54 is interposed between a fluted stem 56 formed on the valve element 53 and the wall of a chamber 57, which communicates by way of a passage 58 and pipe 59 with a brake pipe passage 60 formed in the casing of the brake valve device 10 and communicating with the brake pipe 11. The valve element 53 thus controls a communication from the brake pipe to the chamber 51, which in turn communicates with the control chamber 41 of the feed valve device 12 by way of a passage 62 formed in the casing of the valve device 13, a pipe 63, a passage 64 formed in the brake valve casing, a pipe 65 and a passage 66 provided in the feed valve casing. The normally seated valve element 52 is adapted to control communication between the valve chamber 51 and a chamber 68, which is connected by way of a passage 69 and a pipe 70 with the brake valve passage 25 leading to the rotary valve chamber 19.

For actuating the valve elements 52 and 53 there is provided a piston 70, which is operatively mounted in a suitable bore in the casing structure 50 and is subject to the pressure of fluid in a piston chamber 71, which communicates by way of a pipe 72 with a passage 73 leading to the seat of the rotary valve 20 of the brake valve device. The piston 70 has a hollow stem 75 within which is mounted a spring pressed plunger 76, the outer end of which is operatively aligned with a fluted stem 77 formed on the valve element 52. A coil spring 79 is interposed between the piston 70 and a suitable shoulder formed in the casing structure 50 for normally urging the piston into an upper position, as shown in Fig. 1.

When the rotary valve 20 of the brake valve device is disposed in running position, as shown in Fig. 1, or in any position other than emergency position, the piston chamber 71 of the control valve device 13 is vented to atmosphere by way of the pipe 72, passage 73, a cavity 81 formed in the rotary valve 20, and an atmospheric exhaust port 82. The spring 79 thus is normally effective to maintain the piston 70 and plunger 76 controlled thereby in the uppermost position, while the valve elements 52 and 53 are held in their respective seated and unseated positions as already explained. At the same time, in the position of Fig. 1, communication is maintained between the rotary valve chamber 19 and the brake pipe 11 by way of a port 85 formed in the rotary valve 20 and the passage 60.

The brake pipe 11 also communicates with the control chamber 41 of the valve device 12, by way of the passage 60, pipe 59, chambers 57 and 51 of the control valve device 13, passage 62, pipe 63, passage 64, pipe 65 and passage 66. While the brake pipe pressure is below the value normally maintained, as determined by the setting of the adjustable element 47 of the feed valve device 12, the fluid pressure in the control chamber 41 will be insufficient to move the diaphragm 43 downwardly against the force of the spring 46 so that the needle valve 40 will remain seated, and as a result the piston 32 will be positioned by the spring 34 to hold the valve element 27 in its unseated position. With the valve element 27 unseated, air under pressure is supplied from the main reservoir 14 by way of the pipe 30, passage 29, valve chamber 24 of the feed valve device, and passage 25 to the rotary valve chamber 19, from which the air continues to flow through the port 85 and passage 60 to the brake pipe 11. As the brake pipe pressure approaches the normal value, however, the diaphragm 43 of the feed valve device is moved downwardly for unseating the needle valve 40, and the pressure of air thereby supplied to the piston chamber 32 then forces the piston 32 downwardly for shifting the valve element 27 to the throttling or closed position.

It will thus be apparent that while the brake valve device 10 is disposed in running position, which is here used by way of illustration and is intended to represent any position with the exception of the emergency position, the rate of discharge or delivery of compressed air by way of the feed valve device 12 is automatically regulated in accordance with a remote pressure, in this case brake pipe pressure.

If the rotary valve 20 of the brake valve device is now moved to emergency position for effecting an emergency application of the brakes, as is shown in Fig. 2 of the drawing, the brake pipe passage 60 is thereby connected to the atmospheric exhaust port 82 by way of a cavity 87 formed in the rotary valve. While the brake pipe pressure is thus reduced at an emergency rate, a quick application of the locomotive brakes is at the same time effected in the usual manner by the supply of air under pressure from the rotary valve chamber 19 of the brake valve device through a port 90 in the rotary valve to a communication 91, which in actual practice is adapted to be connected to the application cylinder of the usual distributing valve. The distributing valve is not illustrated in the drawing but is a well known part of the aforementioned No. 8ET equipment.

The feed valve device 12 meanwhile continues to operate to regulate the pressure of air supplied to the rotary valve chamber 19, and consequently to the distributing valve device as just explained, at a substantially uniform rate. But due to the automatic operation of the control valve device 13 control of the feed valve device is now transferred from the brake pipe to a point near the outlet or discharge communication of the feed valve device. According to the present invention, this operation is accomplished by movement of the rotary valve 20 into emergency position as shown in Fig. 2, wherein the main reservoir passage 29 is connected by way of a rotary valve port 93 to the passage 73 leading to the piston chamber 71 of the control valve device 13, the piston 70 of which then responds to the increase in pressure in the chamber 71 for unseating the valve element 52 while moving the valve element 53 to seated position. With the valve elements 52 and 53 thus moved into their lowermost positions, the desired control communication is established from the feed valve discharge passage 25 to the control chamber 41 of the feed valve device, by way of communication hereinbefore described, including pipe 70, passage 69, chambers 68 and 51, passage 62, pipe 63, passage 64, pipe 65 and passage 66.

When the brake valve handle 21 is moved out of the emergency position, the chamber 71 in valve device is vented to the atmosphere, as previously described, so that the parts of valve device 13 assume the positions of Fig. 1 and control of the feed valve device by brake pipe pressure is restored.

It will now be apparent that the invention just described constitutes an improved auxiliary control means for a feed valve device of the remote-control type, which means is constructed and arranged to respond directly to operation of the brake valve device for preventing undesired fluctuations in the operation of the feed valve device during an emergency application of the brakes.

Although one preferred embodiment of the invention has been described in detail, it is not intended to limit the scope thereof to that embodiment or otherwise than by the terms of the appended claims.

Having now described my invention, what I claim as new and desire to secure by Letters Patent, is:

1. In a fluid pressure brake equipment including a brake pipe, a brake valve device and a feed valve device having a pressure responsive regulating means and a fluid supply passage, in combination, control valve means having a normal position for maintaining communication between said regulating means and said brake pipe, and another position for establishing communication between said fluid supply passage and said regulating means, and fluid pressure actuated means operative upon an increase in the pressure of fluid supplied upon movement of said brake valve device to emergency position for shifting said control valve means from the normal position to said other position.

2. Auxiliary control means for a feed valve device of the type having a fluid supply passage and regulating means adapted to respond to a control pressure, comprising valve means operative in one position to subject said regulating means to a normal control pressure and operative in another position to isolate said regulating means from said normal control pressure while establishing communication between said regulating means and said fluid supply passage of the feed valve, and a movable abutment operative upon an increase in fluid pressure for moving said valve means to said other position.

3. In a locomotive fluid pressure brake equipment including a brake valve device having an emergency position and a feed valve device of the type having a fluid supply port and regulating means adapted to respond to a control pressure, the combination of valve means operative in one position to subject said regulating means to a normal control pressure and operative in another position to isolate said regulating means from said normal control pressure while subjecting said regulating means to the pressure of fluid delivered by the feed valve through said fluid supply port, a movable abutment operative upon an increase in fluid pressure for shifting said valve means from said first position to said other position, and means for supplying fluid under pressure to said movable abutment from said brake valve device upon movement thereof to emergency position.

4. In a fluid pressure brake system including a brake pipe, a brake valve device having an emergency position, and a feed valve device of the remote-control type having a fluid pressure responsive regulating means, in combination, a valve assembly biased toward a normal position for maintaining control of said regulating means by brake pipe pressure, and a movable abutment responsive to an increase in pressure of fluid supplied by said brake valve device when in emergency position for causing said valve assembly to subject said regulating means to control by a substantially constant pressure.

5. The combination of a feed valve device including a flow control valve, and a pressure responsive device arranged to actuate said valve; and means operable by pressure supplied thereto for subjecting said pressure responsive device to pressure at the discharge side of said valve, and operable upon the absence of pressure supplied thereto to subject said pressure responsive device to pressure at a point remote therefrom.

6. The combination of an engineer's brake valve; a brake pipe; a feed valve normally controlled by brake pipe pressure and controlling air supplied to the engineer's brake valve; and means rendered effective upon the increase in pressure of fluid supplied by the engineer's brake valve when in emergency position for subjecting said feed valve to control by pressure at its outlet.

7. The combination of a brake valve device including a flow controlling valve, and a pressure responsive device arranged to actuate said valve; a brake pipe; another pipe; an engineer's brake valve having at least two positions, in the first of which it supplies air from the feed valve to the brake pipe, and in the second of which it vents the brake pipe and supplies air from the feed valve to said other pipe; and means controlled by the position of said brake valve device and effective in said first position to subject said pressure responsive device to brake pipe pressure, and operative by fluid supplied by said brake valve in said second position to subject said pressure responsive device to a pressure adjacent the discharge of the flow controlling valve.

8. The combination of a feed valve device including a flow controlling valve device having a flow controlling valve, and a pressure responsive device arranged to actuate said valve; a brake pipe; another pipe; an engineer's brake valve having at least two positions, in the first of which it supplies air from the feed valve to the brake pipe and in the second of which it vents the brake pipe and supplies air from the said valve to said other pipe and to a passage; and means controlled by the position of said brake valve and effective in said first position to subject said pressure responsive device to brake pipe pressure, and operative by pressure supplied in said second position to said passage to subject said pressure responsive device to a pressure independent of brake pipe pressure.

9. The combination of an automatic air brake system including an engineer's brake valve, main reservoir, brake pipe and feed valve, said feed valve being normally controlled by brake pipe pressure; and means responsive to fluid at substantially main reservoir pressure supplied thereto by said brake valve, at the time pressure in the brake pipe is reduced to produce an emergency application for subjecting said feed valve device to control by its outlet pressure.

10. In a fluid pressure system, in combination, a brake pipe, a brake valve device having an emergency position, a main reservoir, a feed valve device, and means for normally subjecting said feed valve device to control by brake pipe pressure and operative, when supplied with fluid at substantially main reservoir pressure upon movement of said brake valve to emergency position, for subjecting said feed valve device to control by its own delivered pressure.

11. In a fluid pressure system including a brake pipe, a brake valve device having an emergency position, and a feed valve device, in combination, means for normally subjecting the feed valve device to control by brake pipe pressure, and means operated by main reservoir pressure supplied by said brake valve device in emergency position for subjecting said feed valve device to control by its own delivered pressure.

CHARLES H. McKINSTRY.